United States Patent [19]

Forté et al.

[11] Patent Number: 5,278,955
[45] Date of Patent: Jan. 11, 1994

[54] OPEN SYSTEMS MAIL HANDLING CAPABILITY IN A MULTI-USER ENVIRONMENT

[75] Inventors: Roger W. Forté, Austin; Ellen J. Stokes, Liberty Hill, both of Tex.

[73] Assignee: International Business Machines Corporation, Armonk, N.Y.

[21] Appl. No.: 539,935

[22] Filed: Jun. 18, 1990

[51] Int. Cl.$^5$ .............................................. G06F 13/00
[52] U.S. Cl. .................................. 395/200; 395/500; 364/DIG. 1; 364/222.2; 364/240.8; 364/241.7; 364/284; 364/284.3; 364/284.4
[58] Field of Search .................... 395/500, 200; 340/825.03, 825.07; 379/219, 220

[56] References Cited

U.S. PATENT DOCUMENTS

| | | | |
|---|---|---|---|
| 4,506,111 | 3/1985 | Takenouchi et al. | 179/2 A |
| 4,648,061 | 3/1987 | Foster | 264/900 |
| 4,677,588 | 6/1987 | Benjamin et al. | 395/325 |
| 4,688,170 | 8/1987 | Waite et al. | 395/500 |
| 4,739,402 | 4/1988 | Maeda et al. | 358/147 |
| 4,790,003 | 12/1988 | Kepley et al. | 379/88 |
| 4,837,798 | 6/1989 | Cohen et al. | 379/88 |
| 4,951,245 | 8/1990 | Bailey et al. | 395/500 X |
| 5,142,622 | 8/1992 | Owens | 395/500 |

FOREIGN PATENT DOCUMENTS

| | | | |
|---|---|---|---|
| 0295904 | 12/1988 | European Pat. Off. | H04M3 50 |
| 2112454 | 10/1987 | Japan . | |
| 62-69437 | 5/1988 | Japan . | |
| 64-37145 | 2/1989 | Japan . | |
| 2-001659 | 1/1990 | Japan . | |

OTHER PUBLICATIONS

Verjinski, Richard D., "PHASE, A Portable Host Access System Environment," 1989 IEEE Military Communications Conference, vol. 3, pp. 806-809.
Tang, Debra, et al., "A Gateway Between MHS (X.400) and SMTP," Proceedings of the Computer Standards Conference, 1988-Computer Standards Evolution: Impact and Imperatives, IEEE Comput. Soc. Press, pp. 7-14.
Racke, Wilhem F., et al., "Extending an Existing Mail Service to Support X.400 Message Handling," Proceedings of the Computer Networking Symposium, 1988, IEEE Comput. Soc. Press, pp. 245-253.
IBM TDB, "Process Manager For A Personal Computer," vol. 30, No. 6, Nov. 1987, pp. 10-15.
IBM TDB, "Real Mail User Interface For In-Basket," vol. 31, No. 10, Mar. 1989, pp. 171-172.
IBM TDB, "Service Processor Architecture and Microcode Algorithm For Performing Protocol Conversions Start/Stop, BSC, SDLC," vol. 31, No. 12, May 1989 pp. 461-464.

Primary Examiner—Paul V. Kulik
Attorney, Agent, or Firm—Mark E. McBurney

[57] ABSTRACT

A system and method is provided which allows users of an OSI mail handling system the advantage of communicating with users of other mail handling systems and utilizing the functionality associated with the OSI system. The functionality of a RFC-987 gateway is extended to provide, in addition to a straight conversion function, full OSI mail handling functions. A conventional mail handler is extended to allow for both OSI mail and conventional mail originating from a user of any mail system to be processed, thus providing a common interface for mail system users. Further, the sendmail component has now been enabled to recognize OSI addresses and route the associated messages to the appropriate destination. Mixed mode addressing has also been extended to include OSI type addresses in an address string that may contain components from several different networks, e.g. TCP/IP, UUCP.

12 Claims, 19 Drawing Sheets

---

```
822 for User C
AIX MH      To: A@DEPT A. CITY. COM
150         From: C@DEPT C. CITY. COM
```

```
SENDMAIL (in the client/user host)
  151    Send on smtp connection via addresses in preceding
         AIX MH box
```

```
SENDMAIL (in the gateway host)
  152    Deliver to user A mailbox via smtp connection
```

```
┌─────────────────────────────────────────────────────┐
│ IPM UA for User A                                   │
│ AIX MH           To:  /C=US/ADMD=ptt/PN=H           │
│   100            From: /C=US/ADMD=ptt/PRMD=CO/O=city;│
│                        /ou=DEPT A/PN=A              │
└─────────────────────────────────────────────────────┘

┌─────────────────────────────────────────────────────┐
│ SENDMAIL                                            │
│         Recognizes X.400 address - routes to RFC 987│
│   101   encoding                             for ASN.1│
└─────────────────────────────────────────────────────┘

┌─────────────────────────────────────────────────────┐
│ RFC 987 Converts ASCII to ASN.1 P1 and P2 Protocol Data Units│
│   102   SUBMITS to MTA                              │
└─────────────────────────────────────────────────────┘
                                    │ Submit
┌─────────────────────────────────────────────────────┐
│ MTA   Accepts SUBMIT and Creates P1 MPDU Relay PDU  │
│       (ASN.1 encoded)                               │
│ Originator Address: C=US        Recipient Address: C=US│
│                     ADMD=ptt                       ADMD=ptt│
│   103               PRMD=CO                        PN=H│
│                     O=CITY                          │
│                     OU=DEPT A                       │
│                     PN=A                            │
└─────────────────────────────────────────────────────┘
                                    │ P1 Relay
┌─────────────────────────────────────────────────────┐
│ MTA   Relay to MTA responsible for H                │
│ Originator Address: C=US        Recipient Address: C=US│
│                     ADMD=ptt                       ADMD=ptt│
│   104               PRMD=CO                        PN=H│
│                     O=CITY, OU=DEPT A               │
│                     PN=A                            │
└─────────────────────────────────────────────────────┘
                                    │ P1 Relay
A ──────────────────────────────────┴────────────── A
```

FIG. 6A

822 for User A
AIX MH          To: /C=US/ADMD=ptt/PN=H
    110         From: A@DEPT A. CITY. COM SENDMAIL
    111    Recognizes X.400 address - routes to RFC 987 for ASN.1
           encoding RFC 987
    112    Translates SMTP message to ASN.1, encodes P1
           and P2 PDUs SUBMITS to MTA Submit MTA    Accepts SUBMIT and Creates P1 MPDU Relay PDU
           (ASN.1 encoded)
Originator Address: C=US           Recipient Address: C=US
                    ADMD=ptt                          ADMD=ptt
    113             PRMD=CO                           PN=H
                    DD=RFC-822=A(a)DEPT A. CITY. COM P1 Relay MTA    Relay to MTA responsible for H
Originator Address: C=US           Recipient Address: C=US
                    ADMD=ptt                          ADMD=ptt
    114             PRMD=CO                           PN=H
                    DD=RFC-822=A(a)DEPT A. CITY. COM P1 Relay

```
┌─────────────────────────────────────────────────────────────┐
│ IPM UA for User B                                           │
│ AIX MH              To:  /C=US/ADMD=ptt/PN=H                │
│        120          From: /C=US/ADMD=ptt/PRMD=CO/O=CITY     │
│                           /OU=DEPT B/PN=B                   │
└─────────────────────────────────────────────────────────────┘

┌─────────────────────────────────────────────────────────────┐
│ SENDMAIL (in the client/user host)                          │
│        Encapsulate mail message in 822 headers to send on   │
│ 121    smtp connection to gateway                           │
│        To:  /C=US/ADMD=ptt/PN=H/@DEPT A. CITY. COM          │
│        From: /C=US/ADMD=ptt/PRMD=CO/O=CITY/OU=DEPT          │
│        B/PN=B/@DEPT B. CITY. COM                            │
└─────────────────────────────────────────────────────────────┘

┌─────────────────────────────────────────────────────────────┐
│ SENDMAIL (in the gateway host)                              │
│        Recognizes X.400 address - routes to RFC 987 for ASN.1│
│ 122    encoding                                             │
└─────────────────────────────────────────────────────────────┘

┌─────────────────────────────────────────────────────────────┐
│ RFC 987                                                     │
│  123   Converts ASCII to ASN.1 P1 and P2 Protocol Data Units│
│        SUBMITS to MTA                                       │
└─────────────────────────────────────────────────────────────┘
                              │ Submit
┌─────────────────────────────────────────────────────────────┐
│ MTA   Accepts SUBMIT and Creates P1 MPDU Relay PDU          │
│       (ASN.1 encoded)                                       │
│ Originator Address: C=US         Recipient Address: C=US    │
│                     ADMD=ptt                        ADMD=ptt│
│ 124                 PRMD=CO                         PN=H    │
│                     O=CITY, OU=DEPT B                       │
│                     PN=B                                    │
└─────────────────────────────────────────────────────────────┘
                              │ P1 Relay
A ────────────────────────────┼──────────────────────────── A
```

FIG. 8A

```
┌─────────────────────────────────────────────────────┐
│ IPM User H                                          │
│         To:  /C=US/ADMD=ptt/PRMD=CO/DD=RFC-822=C(a) │
│  130         DEPT C. CITY. COM                      │
│         From: /C=US/ADMD=ptt/PN=H                   │
└──────────────────────────┬──────────────────────────┘
                           │ Submit
┌──────────────────────────┴──────────────────────────┐
│ MTA    Accepts SUBMIT and Creates P1 MPDU Relay PDU │
│        (ASN.1 encoded)                              │
│ Originator Address: C=US    Recipient Address: C=US │
│                     ADMD=ptt            ADMD=ptt    │
│                     PN=H                PRMD=CO     │
│  131                                    DD=RFC-822= │
│                                         C(a)DEPT C. │
│                                         CITY. COM   │
└──────────────────────────┬──────────────────────────┘
                           │ P1 Relay
┌──────────────────────────┴──────────────────────────┐
│ MTA    Relay to MTA responsible for C               │
│ Originator Address: C=US    Recipient Address: C=US │
│                     ADMD=ptt            ADMD=ptt    │
│                     PN=H                PRMD=CO     │
│  132                                    DD=RFC-822= │
│                                         C(a)DEPT C. │
│                                         CITY. COM   │
└──────────────────────────┬──────────────────────────┘
                           │ P1 Relay
┌──────────────────────────┴──────────────────────────┐
│ MTA    Deliver to IPM for USER C                    │
│ Originator Address: C=US    Recipient Address: C=US │
│                     ADMD=ptt            ADMD=ptt    │
│                     PN=H                PRMD=CO     │
│  133                                    DD=RFC-822= │
│                                         C(a)DEPT C. │
│                                         CITY. COM   │
└──────────────────────────┬──────────────────────────┘
                           │ Delivery
 A ────────────────────────┼──────────────────────── A
```

FIG. 9A

```
A ————————————————————————————— A
              | Delivery
```

RFC 987
  Translates X.400 message to SMTP, decodes P1 and P2
    PDUs
  Passes to sendmail in 822 format
  To: C@DEPT C. CITY. COM
  From: /C=US/ADMD=ptt/PN=H/@DEPT A. CITY. COM P1 Delivery Envelope:  Recipient Address: C=US
                                            ADMD=ptt
                                            PRMD=CO
134                                         DD=RFC-822=
                                              C(a)DEPT C.
                                              CITY. COM Originator Address: C=US
                                             ADMD=ptt
                                             PN=H P2 Header, Body Parts

---

SENDMAIL (in the gateway host)
  135    Send on SMTP connection to host C

---

SENDMAIL (in the client/user host)
  136    Store in user mailbox

FIG. 9B

822 for User C
AIX MH
140
To: /C=US/ADMD=ptt/PN=H
From: C@DEPT C. CITY. COM

SENDMAIL (in the client/user host)
141  Encapsulate mail message in 822 headers to send on smtp connection to gateway
To: /C=US/ADMD=ptt/PN=H/@DEPT A. CITY. COM
From: C@DEPT C. CITY. COM

SENDMAIL (in the gateway host)
142  Recognizes X.400 address - routes to RFC 987 for ASN.1 encoding

RFC 987
143  Translates SMTP message to ASN.1, encodes P1 and P2 PDUs SUBMITS to MTA Submit

MTA Accepts SUBMIT and Creates P1 MPDU Relay PDU (ASN.1 encoded)

| Originator Address: C=US | Recipient Address: C=US |
|---|---|
| ADMD=ptt | ADMD=ptt |
| PRMD=CO | PN=H |
| DD=RFC-822=C(a)DEPT C. CITY. COM | |

144

P1 Relay

OPEN SYSTEMS MAIL HANDLING CAPABILITY IN A MULTI-USER ENVIRONMENT

BACKGROUND OF THE INVENTION

This invention relates generally to mail handling capabilities utilized by interconnected computer systems. In particular, the present invention was implemented on a RISC System/6000 (RISC System/6000 is a trademark of IBM Corp.) workstation running the AIX (AIX is a trademark of IBM Corp.) operating system as described in detail by "IBM RISC System/6000 Technology", published 1990 by IBM Corp., hereby incorporated by reference. However, it should be noted that the present invention contemplates all multi-user systems interconnected into a network, e.g. Internet. That is, the present invention is in no way limited to a specific hardware platform, or software operating system, it is hardware and operating system independent.

The emergence of open system standards in a UNIX (UNIX is a registered trademark of AT&T) operating system environment has created a great need to provide an interface which will allow users of different communication protocols to communicate with one another. The open systems interconnect (OSI) standard utilizes a mail handling system known as X.400, while other mail handling systems utilize protocols such as simple mail transfer protocol (SMTP), and UNIX to UNIX copy protocol (UUCP). It is currently known to utilize an RFC-987 gateway which will convert an interpersonal message (IPM, which by definition is in the OSI, or X.400 mail format) from X.400 to communications protocols, such as Transmission Control Protocol (TCP), or the like. TCP/IP (Transmission Control Protocol/Internet Protocol) can be considered a family of communications protocols, of which SMTP is a communications (mail handling) program application protocol. When a message is received by an SMTP user via the RFC-987 gateway certain message header fields present in the X.400 mail may not be displayed to the SMTP mail recipient. Thus, with conventional mail handling systems a user does not have the capability to manage, both X.400 and RFC-822 mail from a single mail queue.

Therefore, it would be extremely desirable to have a mail handling system which provides a user the capability to manage both the X.400 and SMTP mail systems from a single mail queue, or local system. Further, a system that provides communications between users of different systems without the requirement that each sender and recipient each have identical mail handling capability would be a significant advantage over conventional mail handling systems.

SUMMARY OF THE INVENTION

In contrast to prior art, the present invention provides a method for utilizing an RFC-987 gateway (RFC-822/X.400) as a means to realize a full Interpersonal Messaging (IPM) capability within a mail handling system. The present invention provides an extended RFC-987 gateway that supports not only the predefined RFC-822/X.400 translation function, but also is capable of emitting a fully conforming X.400 IPM. This gateway capability coupled with an enhanced mail handler provides the user of this system the ability to process either RFC-822 or IPMs from a common mail queue and a single user interface.

To implement the present invention, new features must be added to an operating system mail handler, a sendmail host component and a RFC-987 gateway.

These new features include providing two separate paths through the RFC-987 gateway such that a true interpersonal message function is present. Thus, a straight conversion between a RFC-822 and X.400 mail user messages is provided, as well as a validation feature wherein X.400 messages to be output are validated in RFC-987 (AIX, or other operating system specific mail handling syntax) form and do not have to be converted, but merely submitted to the X.400 message transfer agent (MTA) for output to the X.400 system. For incoming X.400 messages, the present invention does not attempt to convert the message to RFC-822 form, but merely passes it to the sendmail component for processing. RFC-822 syntax is recognizable to a user of a SMTP mail handling system, since it is a mail syntax component which separates TCP communication protocol commands into a standard format for text messages. The RFC-987 gateway of the present invention also provides a path which allows users of a SMTP mail system to communicate with users of an X.400 mail handling system. The RFC-822 message addressed to an X.400 user will be converted into the proper X.400 form. Further, for incoming messages, X.400 mail addressed to SMTP users is converted into RFC-822 form for receipt by the TCP communications service.

The sendmail host component has also been modified to allow handling of X.400 style addresses, as well as RFC-822 style addresses. Thus, the sendmail host component is capable of recognizing X.400 addresses and routing the associated messages to the X.400 network or directly to another sendmail host, that in turn will route the message to the X.400 network.

The present invention also extends the capability of the mail handler in two primary areas. First, the mail handler header must be extended to provide for the additional header fields present in an interpersonal message (X.400). Second, the mail handler must be extended such that non-ASCII body parts can be tolerated. That is, a viewer of the message is made aware of the existence of non-ASCII data.

The mail handling interface of the present invention also provides for mixed mode addressing. That is, X.400, TCP and UUCP addresses can compose a single destination address. The mixed addresses are read from left to right. A slash is utilized to delimit X.400 addresses in mixed addresses. The characters @, !, and : are still retained from prior art to delimit TCP and UUCP addresses.

Therefore in accordance with the previous summary, objects, features and advantages of the present invention will become apparent to one skilled in the art from the subsequent description and the appended claims taken in conjunction with the accompanying drawings.

BRIEF DESCRIPTION OF THE DRAWINGS

FIGS. 6A and 6B are a block diagram showing how a X.400 user of the present invention can send a message to a X.400 user connected to an OSI system;

FIGS. 7A and 7B are another block diagram showing how a SMTP user of the present invention can send a message a X.400 user, connected to an OSI system;

FIGS. 8A and 8B are a block diagram illustrating how a X.400 user, connected to a TCP system can sendmail to a X.400 user connected to an OSI system;

FIGS. 9A and 9B show how a X.400 user, connected to an OSI system can send a message to a SMTP user, connected to a TCP system, via the present invention;

FIGS. 10A and 10B are a block diagram showing how a SMTP user, connected to a TCP system can sendmail to a X.400 user, connected to an OSI network, via the gateway host of the present invention;

DETAILED DESCRIPTION OF THE PREFERRED EMBODIMENT

Figure 1:
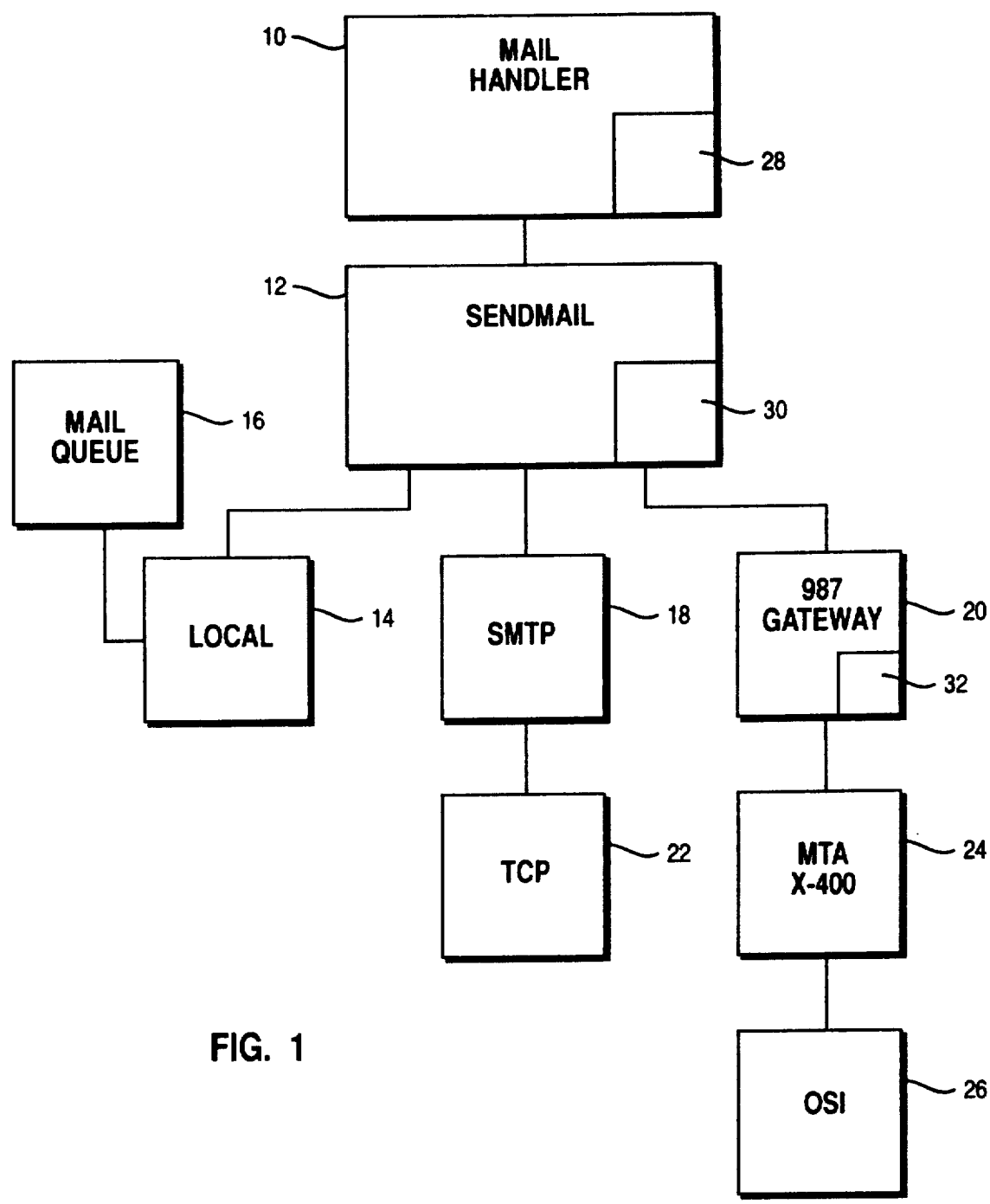
FIG. 1 is a block diagram showing the components of the mail handling interface of the present invention.

The overall structure and operating environment of the present invention will now be described with reference to FIG. 1 wherein reference numeral 1 represents a local mail handling system as contemplated by the present invention. A mail handler 10 and sendmail component 12 are included. Next, a local mail component 14 is shown interconnected to a mail queue 16 which is accessible by a user of the present invention through the user interface provided with the operating system being utilized. Simple mail transfer protocol (SMTP) communication 18 is provided and in communication with sendmail 12. TCP communication protocol 22 is provided and also in communication with SMTP 18. As, noted above, TCP 22 represents a family of communication protocols which is described in greater detail in the RFC (Request For Comments) documents published by the Internet Architecture Board (IAB), hereby incorporated by reference. The RFC-987 gateway 20 is provided and also in communication with sendmail 12 as well as message transfer agent 24, which is considered part of the X.400 network. MTA 24 is further shown as being connected to the open system interconnect (OSI) network 26. Reference numerals 28, 30 and 32 represent the additional features to mail handler 10, sendmail 12 and RFC-987 gateway 20, respectively, which are provided by the present invention. It should be noted that the present invention will be described with reference to mail communications between a SMTP (TCP) and X.400 (OSI) network, although other configurations of mail handling systems are contemplated by the present invention.

Figure 2:
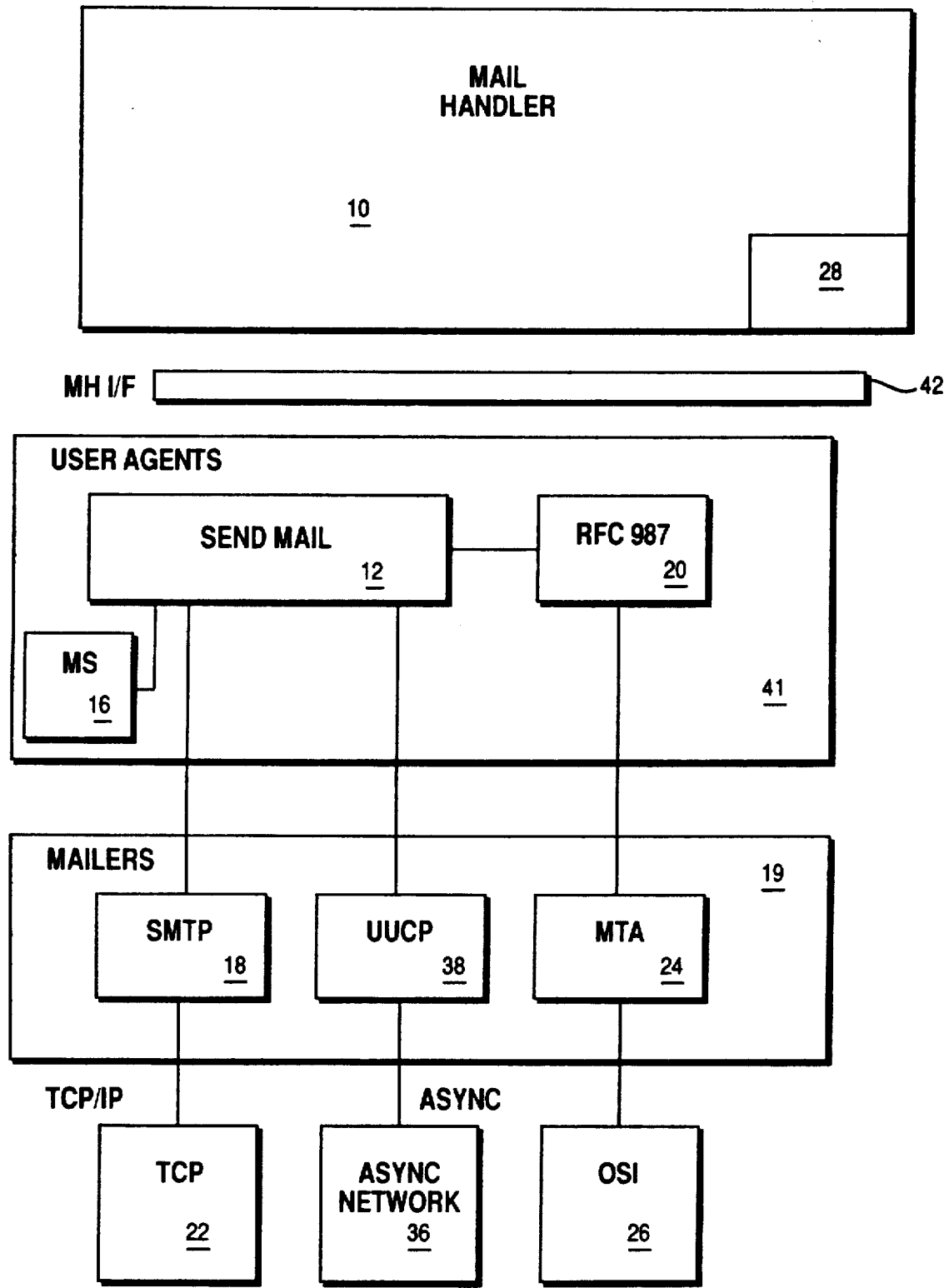
FIG. 2 is a block diagram illustrating the interconnection of the present invention with various mail handling systems, such as TCP, X.400 and UUCP.

FIG. 2 is a block diagram further showing the components of the present invention and their interconnection with components of other mail handling systems. The functionality for a user of the present invention to send and receive mail via mail handler 10, sendmail 12 and mail queue 16 is shown. A mail handler interface 42 is provided such that mail handler 10 can communicate directly with user agent layer 41, which includes sendmail 12, RFC 987 gateway 20.

Sendmail 12 is connected to a mail queue, or message store component 16 such that mail can be received and/or sent by a user of the mail handler system 10. As previously noted, sendmail 12 interconnects with RFC-987 gateway 20 and SMTP application protocol 18. In addition, sendmail 12 is interconnected with UNIX to UNIX copy protocol (UUCP) 38 which provides sendmail 12 with the capability of communicating with other mail handling systems interconnected to asynchronous network 36. SMTP 18, UUCP 38 and MTA 24 are all considered in FIG. 2 to be part of a layer denoted as mailers 19. TCP 22. ASYNC 36 and OSI 26 communication protocol represent the lowest layer of FIG. 2. When mail reaches this layer, all mail handling functions provided by the present invention have been completed and the message to be sent is output to one of these communication protocols for distribution to mail handling system interconnected thereto. Further, these communication protocols receive incoming messages from mail handling systems interconnected to the respective networks, described above.

Figure 3:
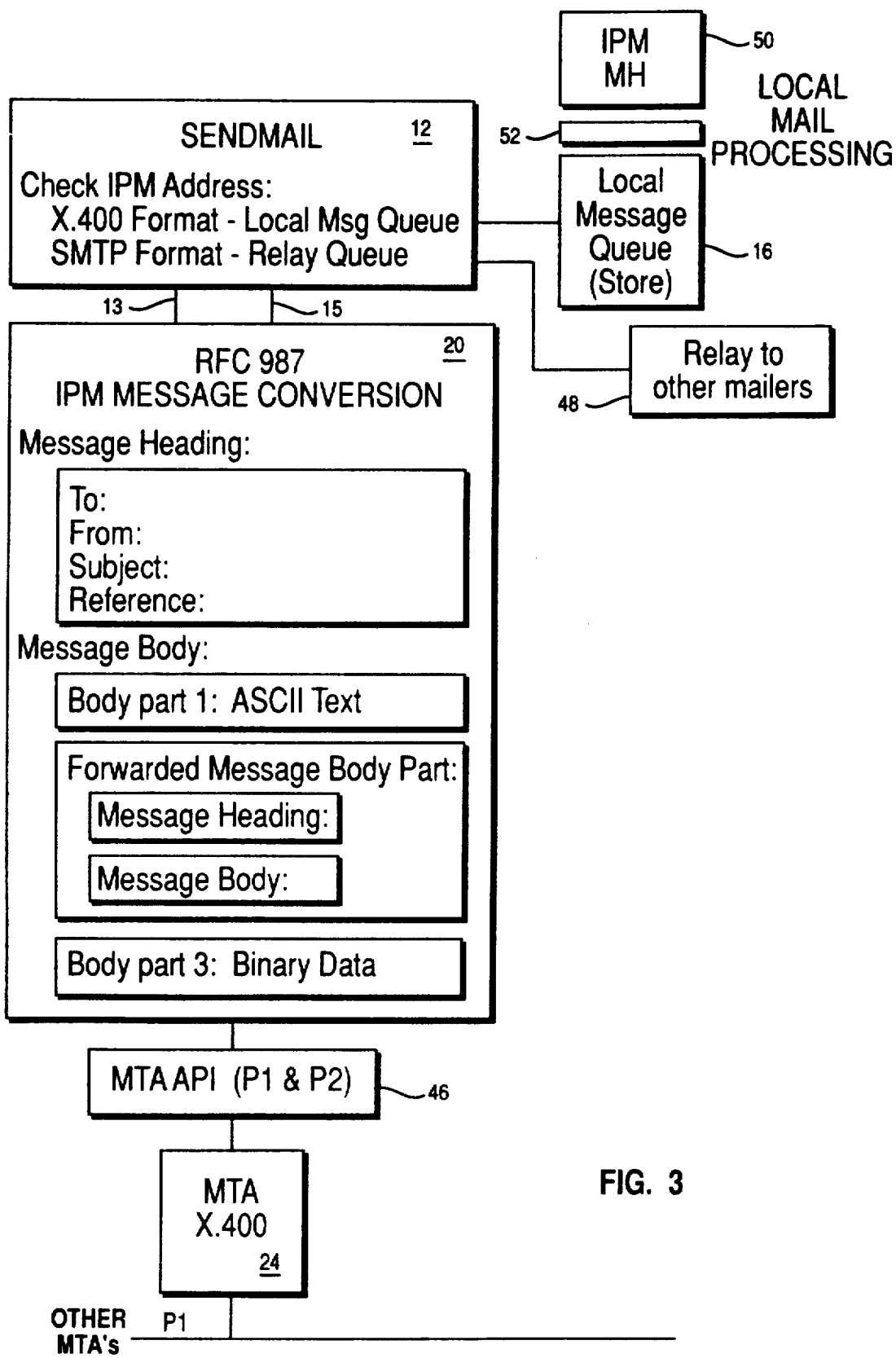
FIG. 3 represents the RFC-987 gateway of the present invention and particularly shows the features added by the subject invention.

FIG. 3 illustrates the new functionality (reference numeral 30 of FIG. 1) provided by the present invention to sendmail 12 and RFC-987 gateway 20 (reference numeral 32 of FIG. 1). RFC-987 gateway 20, now provides two functions, or paths through RFC-987 gateway 20, for users of either the SMTP or X.400 mail handling systems. First, it provides a path for mail from IPM. X.400 users to the X.400 message transfer agent (MTA 24). It should be noted that MTA 24 represents the X.400 network and is considered a component of a overall OSI system. Therefore, once the message has been sent to MTA 24, it is considered to be received by the X.400 network. Second, gateway 20 provides a path and message conversion facilities for TCP or UUCP network users interconnected to the X.400 message transfer network. That is, TCP or UUCP users interconnected to the X.400 system through a conventional RFC-987 conversion gateway will be able to send messages, via MTA 24, for receipt by X.400 users of the present invention. Thus, the RFC-987 gateway 20 has been extended to allow the additional capability of providing not only a standard conversion between RFC-822 and X.400 mail users, but also provides the capability of a true IPM function, which is accomplished by defining the two logical paths between the RFC-987 gateway 20 and sendmail 12. The first path, X.400 path 13 is enabled when sendmail 12 places a message on its output queue in X.400 form. In this case RFC-987 gateway 20 does not convert the message but merely completes validation checks to insure that the message is capable of being submitted to MTA 24. For messages being delivered, MTA 24 places these incoming messages, which are the responsibility of gateway 20, on the input queue for RFC-987 gateway 20. These messages are then recognized by gateway 20, due to the X.400 destination address, and no attempt is made to convert the message to RFC-822 form. The message is merely transferred to sendmail 12 for processing. When sendmail 12 sees an X.400 address received from gateway 20, the message is placed in local message queue 16 for the recipient specified in the address. After the message is received, the recipient will process this message using IPM mail handler 50, via interface 52.

The second path 15 between gateway 20 and sendmail 12 provides a user of other communications protocols (such as TCP and UUCP) access to X.400 mail handling systems. Gateway 20 will convert an outgoing RFC-822 message addressed to a X.400 IPM user into the proper X.400 form. This message is then transferred through path 15 and MTA application programming interface 46 onto MTA 24 for distribution to the X.400 mail user. Path 15 also provides for incoming mail such that X.400 mail addressed to a user of a SMTP mail handling system is in the proper form to allow receipt by the SMTP user. In this case the X.400 message is transmitted from MTA 24 through interface 46 and path 15 through gateway 20. Gateway 20 converts the X.400 message into RFC-822 format before transmitting the message to sendmail 12 through path 15. Sendmail 12 then distributes the SMTP formatted message into relay 48 for delivery to the SMTP user.

Sendmail 12 had its configuration file modified from its standard implementation to allow X.400 style addresses to be processed. This extension allows sendmail 12 to process both RFC-822 and X.400 style addresses. It should be noted that RFC-822 addresses are often denoted as RFC-822 messages which indicate address syntax which is utilized to communicate with a user of SMTP application protocol. The present invention allows sendmail 12 to recognize X.400 addresses and route them directly to the X.400 network (via MTA 24), or to another sendmail host 12 for routing to the X.400 network by another MTA.

In particular, sendmail 12 is extended to allow for X.400 mail requests. These extensions include a parser which is capable of recognizing X.400 addresses. A second extension includes adding function which defines the relay 48 to other sendmail components which are capable of handling the X.400 protocol. The ability of sendmail 12 to define a X.400 relay in the sendmail configuration file 30 is used to transfer X.400 mail traffic from a X.400 user over a TCP/IP network to sendmail 12 and a RFC-987 Gateway. An IPM host which is not directly connected to the X.400 network may still take advantage of the present invention so long as the relay 48 (FIG. 3) is defined and communication to sendmail 12 is achieved.

Sendmail 12 with an updated configuration file 30 determines if the path of the X.400 mail being transmitted through RFC-987 gateway 20 is local or remote. Should an IPM be relayed by sendmail via the TCP communication network in order to reach the X.400 network, then the X.400 address identifier (X400) will be appended to the end of the original X.400 message by sendmail 12. Relay 48, when sending a X.400 mail request encapsulated in a RFC-822 message to a specified X.400 gateway, strips off the RFC-822 address and passes, via sendmail 12, the X.400 message to the RFC-987 gateway 20 and onto the X.400 message transfer agent 24.

Figure 4:
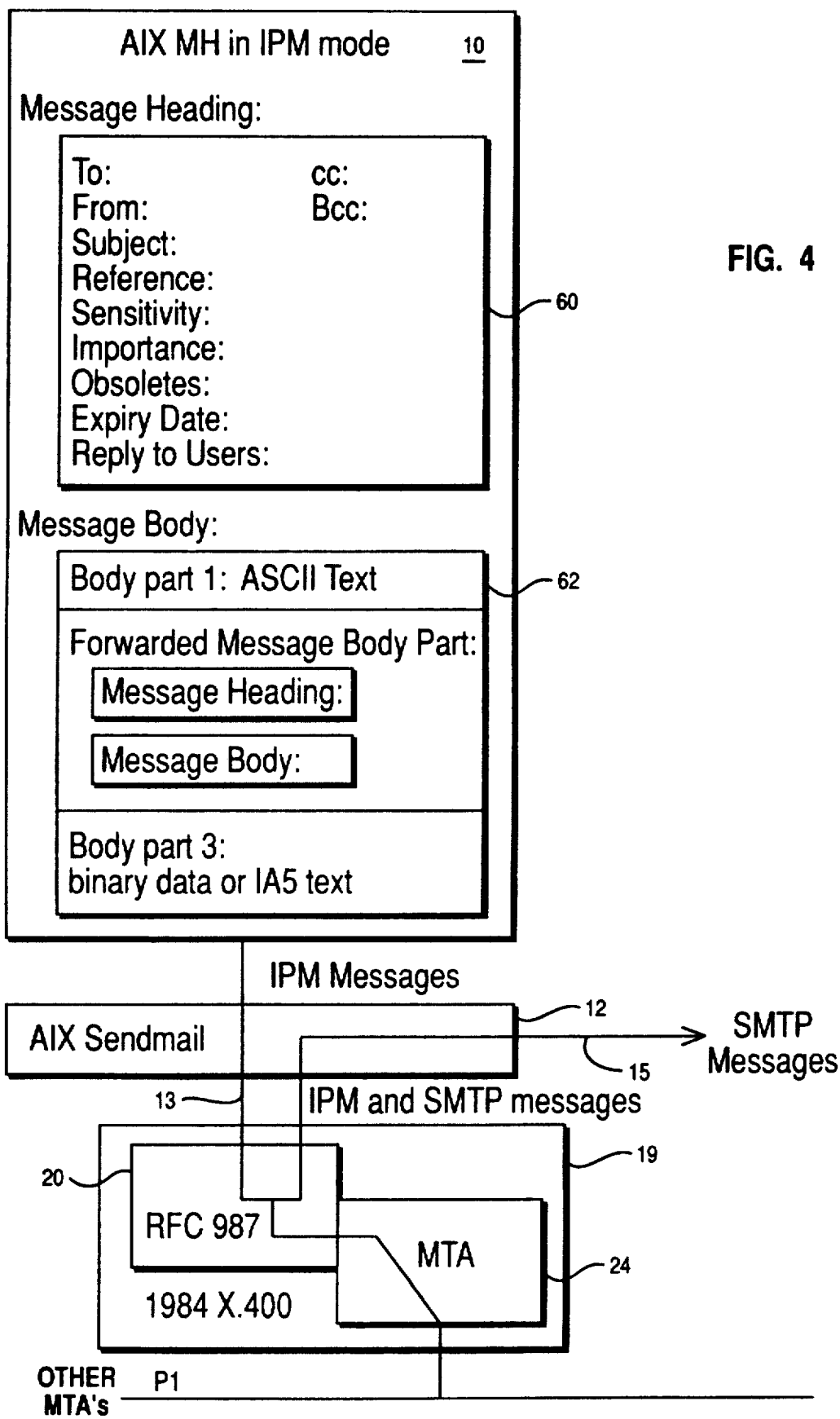
FIG. 4 illustrates the particular features of the present invention as they relate to the mail handler component of the mail handling system.

FIG. 4 illustrates in further detail mail handler 10 and its connection with sendmail 12, RFC-987 gateway 20 and MTA 24. The new features added by the present invention to mail handler 10 (reference numeral 28 Of FIG. 1) which enables mail handler 10 to operate as an IPM-UA 40 requires extensions to its conventional capability in two primary areas. First, mail handler 10 must provide for the additional header fields that may be present in an interpersonal message. As noted in FIG. 4, reference numeral 60 indicates a message heading block wherein the new header field of sensitivity, importance, obsolete, expiry date and reply to users are included and are not present in a conventional mail handler 10. Sensitivity refers to the nature of the message (urgent, normal, non-urgent), importance (low normal, high), obsoletes (IPM Message), expiry date, (a date in the future, mm/dd/yy, dd.mm.yy, or month day, year), and reply by (a date in the future, mm/dd/yy, dd.mm.yy, or month day, year). It should be noted that these headers will be visible to a user of the present invention on a display monitor, such as a CRT, or the like, and a template may be used which will allow the user to generate addresses in the proper X.400 format. Reference numeral 60 is representative of a template which may be used by the present invention. Further, a second extension to the mail handler 10 must be made such that a message body which is an other than ASCII text can be tolerated. That is a user viewing the message body is made aware of the existence of non-ASCII data such that the user can make provisions to process the non-ASCII data outside of the mail handling environment. Reference numeral 62 on FIG. 4 represents message body parts wherein body part one shows the ASCII text which will be displayed, a forwarded message part and body part 3 which may include non-ASCII data, such as binary. In this manner, it can be seen how multi-body parts can be handled by the increased functionality of mail handler 10 in accordance with the sending of interpersonal messages (IPM). Further, the two paths between the RFC-987 gateway 20 and sendmail 12 can be seen wherein the X.400 message can be input to MTA 24 and then passed through gateway 20, via path 13, to sendmail 12 for processing as an IPM X.400 message. Additionally, the X.400 message from the MTA 24 can be converted in RFC-987 gateway 20 and output through path 15 as an RFC-822 message to sendmail 12 and ultimately to users of SMTP mail handling systems, in a manner previously described.

Figure 5:
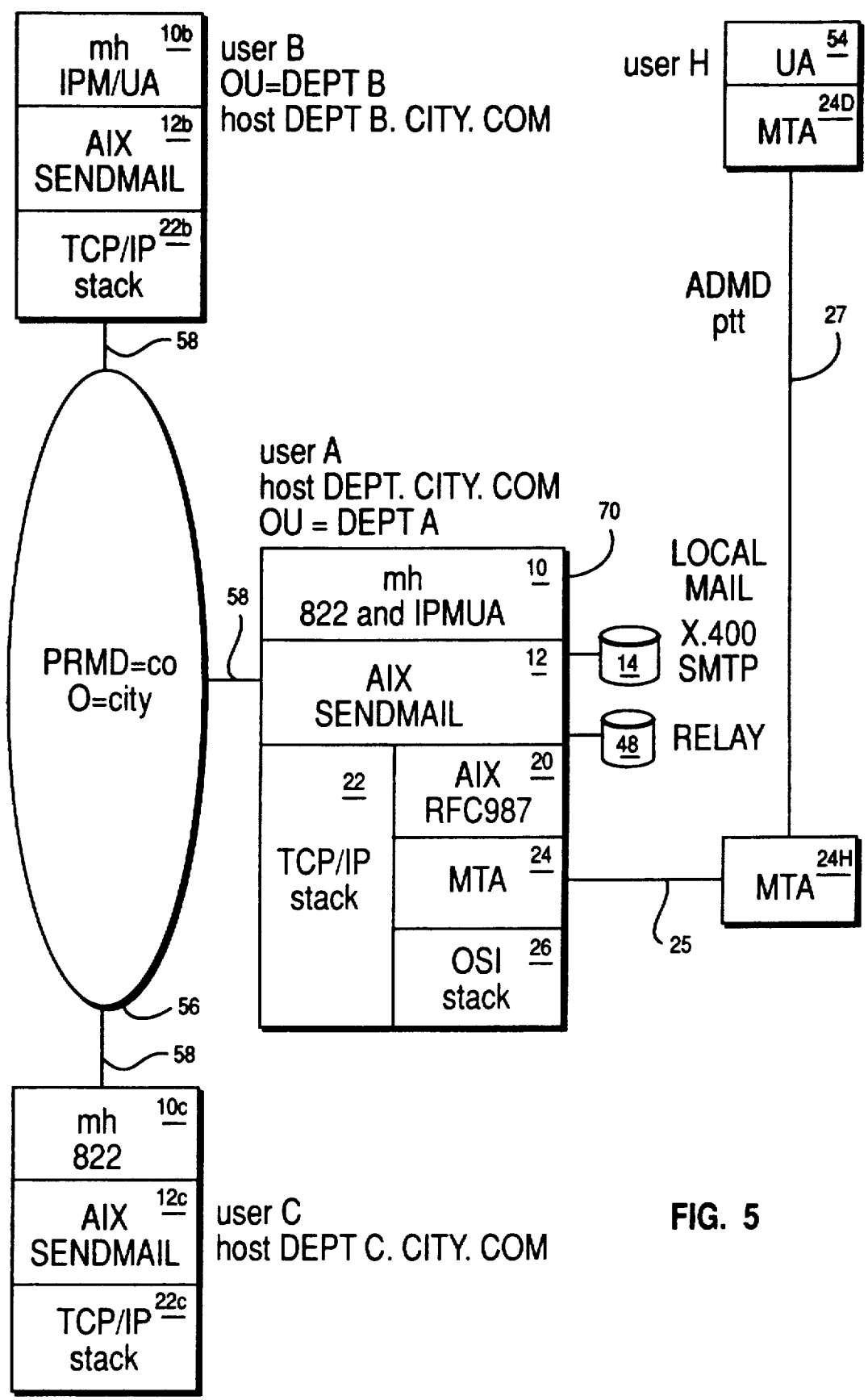
FIG. 5 is a schematic diagram showing the interconnection of a mail handling system of the present invention with prior art mail handling systems.

FIG. 5 is a schematic diagram representative of a multiple-user mail handling system using different communication protocols (specifically TCP and OSI) and the interconnection therebetween. For example, user A represents a mail handling system of the present invention and is noted by reference numeral 70 as the gateway host interface which encompasses the present invention and includes a mail handling layer 10 with both a RFC-822 and an IPM-UA mail syntax component as well as sendmail component 12. Local mail box and associated mail queue 14 for X.400 and RFC-822 messages is provided along with relay 48, defined by the extensions to sendmail 12, as previously discussed. RFC-987 gateway 20. MTA 24 and OSI component 26 are also provided as well as TCP stack 22. Additional MTAs 24h and 24d are interconnected with communications links 25,27 and represent the X.400 communication network. User agent 54 is also provided and associated with a user H in FIG. 5. The X.400 network is representative of an administrative domain (ADMD) this notation being a parameter utilized by a X.400 mail handling system for addressing messages. User B is representative of a X.400 mail system user, i.e. IPM user at mail handler 10B in conjunction with a conventional sendmail 12 and TCP stack 22. User B utilizes TCP communication protocol 22 for checking local mail 14 for any incoming X.400 messages. The X.400 messages can be received by a user with a configuration as shown in conjunction with user B when placed in local mail 14. In order for a user of a mail handling system directly connected to the X.400 network to check messages in mail queue 14. TCP protocol is utilized. Further, user C is a SMTP mail handling system user and includes in its associated configuration of components, mail handler 10 with RFC-822 syntax, sendmail 12 and TCP stack 22. Communications link 58 interconnects user A, B and C to a private domain network (PRMD) such as may be used internally by a university or corporation and is noted by reference numeral 56.

An example of the present invention will now be described with reference to FIG. 5. In the first case assume that user A utilizes a combined (RFC-822 and IPM) mail handler 10 and its associated user interface. Further assume that user A of mail handler 10 desires to send a X.400 message to user H. X.400 IPM addresses have the following form:

| Country: | /C=[xx] |
| ADMD: | /ADMD[xxxxxxxxxxx] |
| PRMD: | /PRMD=[xxxxxxxxxxx]/ |
| Organization: | /O=[xxxxxxxxxxx]/ |
| Organization Unit: | /OU=[xxxxxxxxxxx]/ |
| Personal Name: | /PN=[x.x.xxxxxxxxxx]/ |
| Generation Qualifier: | /GQ=[xxxx]/ |
| Domain Defined: | /RFC-822=xxxx@xxxx/ |

For the purposes of the following examples assume that: country=US; ADMD=ptt(FIG. 5): PRMD=co (company); O=city: OU=depta, deptb, deptc: PN=A,B,C; and DD=RFC-822=A,B,C@depta, deptb, deptc.city.com.

Further, it will be seen from the subsequent examples that a user must be familiar with X.400 addressing, even if connected to a SMTP system. Each address must contain enough information to ensure that only a single user in the X.400 domain is identified. Ambiguous addresses will result in non-delivery of messages. Proper originator/recipient addresses must be provided for the To:, cc:, bcc:, reply to:, from: identifiers and the like. The From: address will often be derived from the user's personal name (PN) and additional address components established by the local system.

Figure 6B:
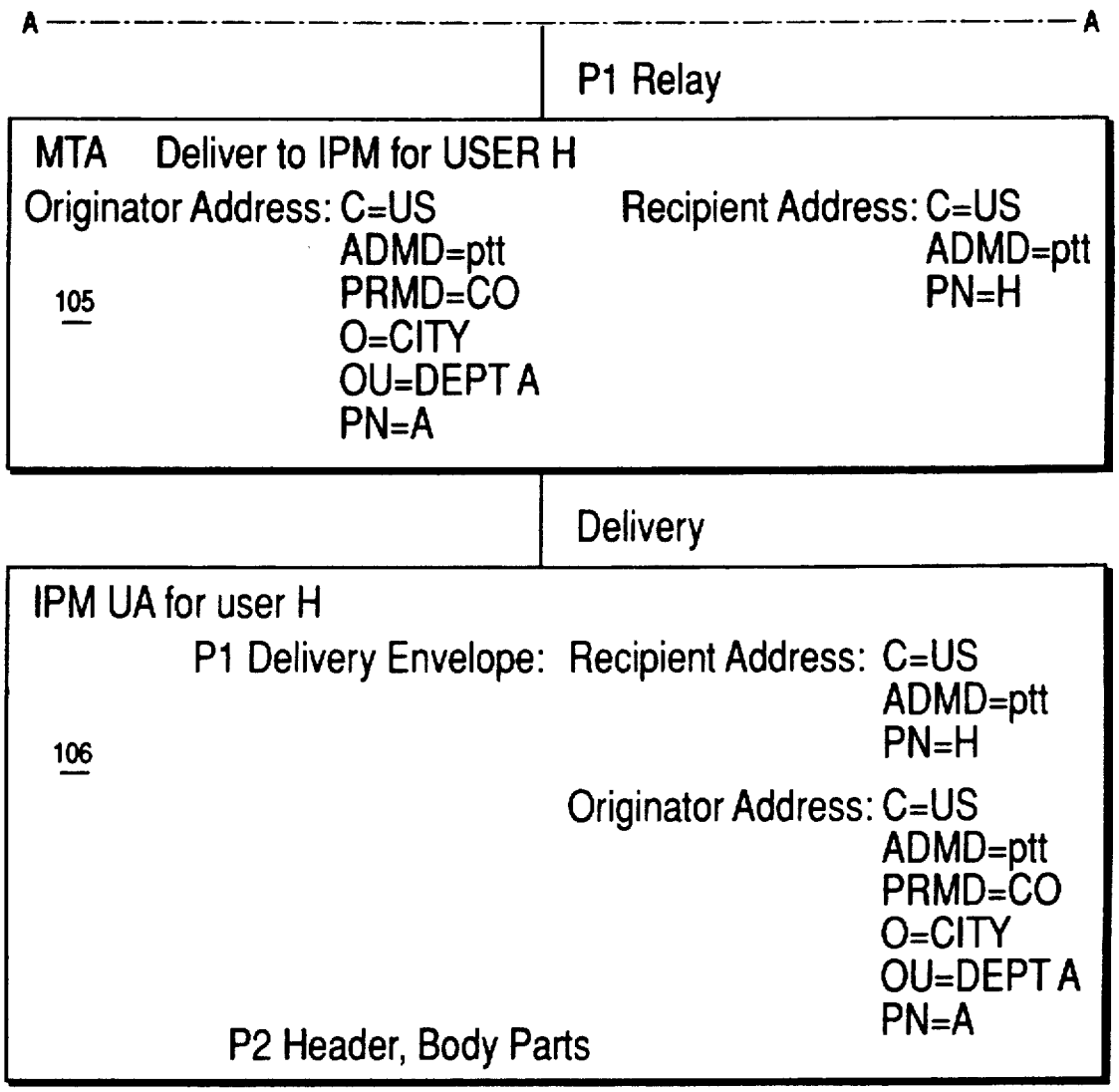

A specific example will now be described with reference to FIGS. 5 and 6, FIG. 6 represents a process whereby user A (FIG. 5) sends an IPM to X.400 user H. Referring to FIG. 6, reference numeral 100 indicates the addresses which must be generated by user A. For the recipient address, it can be seen that: (1) the country is US; (2) the administrative domain (ADMD) is ptt: and (3) PN corresponds to H (for user H). The originating address also notes US as the country, ptt as the administrative domain (ADMD), a private domain (PRMD) noted as co indicating a company (any company name could be substituted). The organization (O) is noted as a city (which often times may be designated as a plant or company location city). The organization unit (OU) is noted as department A (depta) which corresponds to user A (any organization unit such as user IDs, names and the like can be used in this portion of the address). Personal name (PN) is noted as A, since user A is sending the message. Once the message is generated by user A and corresponding mail handling application 10 in IPM mode, sendmail 12 recognizes the address generated for user H as a X.400 address and routes the message to RFC-987 gateway 20 (reference numeral 101, FIG. 6). Block 102 indicates the conversion from ASCII text to abstract syntax notation version 1 ASN.1 protocol data units and further submits this data to message transfer agent 24. As noted by reference numeral 103, MTA 24 accepts the data from RFC-987 gateway 20 and notes the originator address, i.e. country, ADMD, PRMD, organization, organization unit and personal name. The recipients X.400 address is also noted by gateway 20, i.e. country, ADMD and personal name. This information is then relayed to MTA 24h on the X.400 network that is responsible for addresses corresponding to user H (reference numeral 104). Another message transfer agent 24d, as shown in FIG. 5 receives the address information as noted above for delivery of the mail to the IPM user H. Finally, at block 106, the message is delivered to user H, the message including the recipient address, originator address, header and body parts, which make up the bulk of the communication.

Figure 7B:
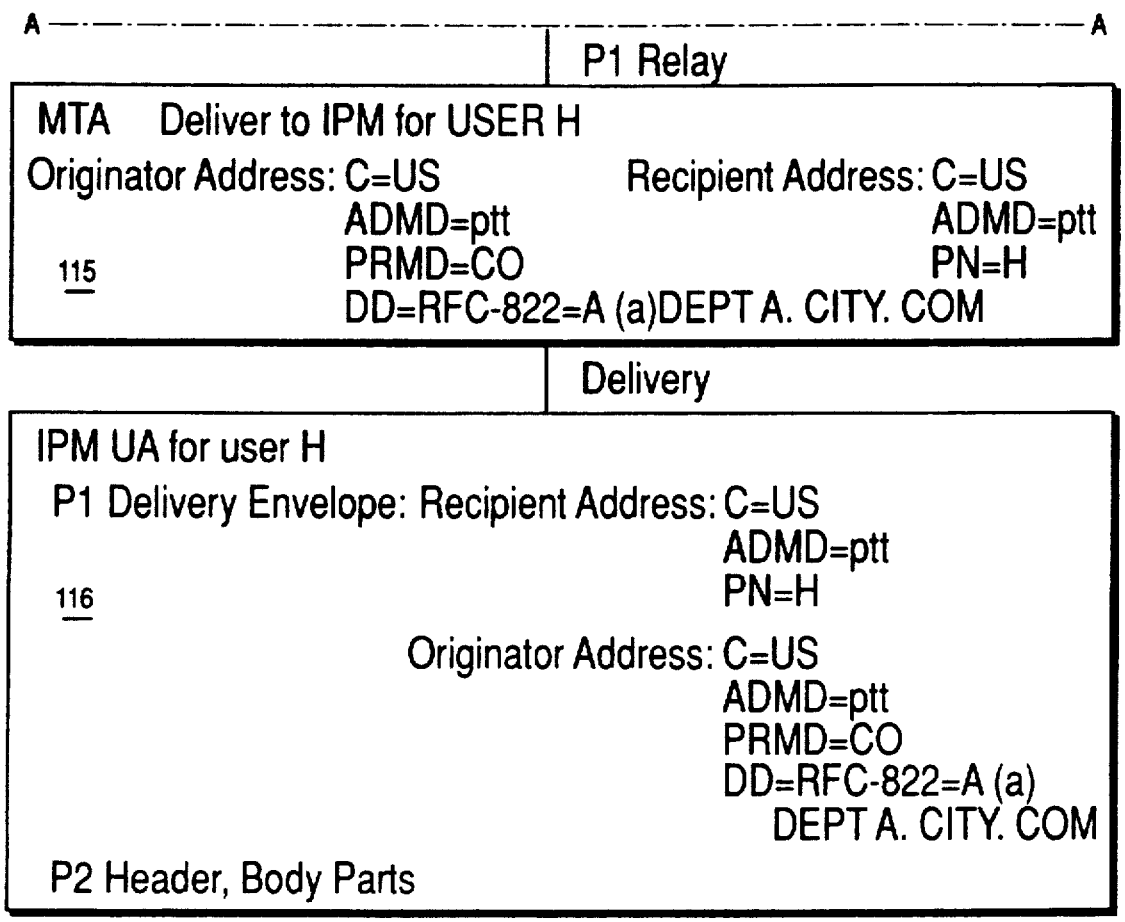

An example of the transmission of a message generated by user A through the SMTP mail system (mail handler 10) to user H will now be described. Again the address for user H is generated by user A utilizing the components of host gateway 70 including mail handler 10 as noted in FIG. 5. Reference numeral 110 of FIG. 7 represents the address for user H which is identical to the address previously discussed with reference to FIG. 6. The originating address for user A is generated RFC-822 syntax. It can be seen that the originating address differs from that of FIG. 6 in that the RFC-822 address for user A is shown as A@depta.city.com. The originating address as shown in block 110 of FIG. 7 is in RFC-822 syntax. The depta.city.com syntax represents tokens which are used to identify a specific user. These tokens are separated by periods, or "dots" and identify the user specified to the left of the "@" or (a) character. Tokens are issued from a centralized registration authority to an organization which represents a group of users operating within a domain or responsibility. It can be seen that registration authority is delegated to a lower level of detail as the address is read from right to left. For example, in block 110 the right token (com) indicates commercial organization; the middle token city, or location; and the left token a department. Left of the "@" character is the user being identified, in this case, user A. Sendmail 12 recognizes the address for user H as an X.400 address and routes the message to RFC-987 gateway 20 in the same manner as discussed with reference to FIG. 6. RFC-987 gateway 20 then translates the RFC-822 message (which is generated by the RFC-822 mode of mail handler 10) into ASN.1 and encodes the delivery information, message header and body parts protocol data units for submission to MTA 24. MTA 24, at block 113, accepts the translated RFC-822 message from RFC-987 gateway 20 and creates a relay protocol data unit for the encoded message with an originating address with the country. ADMD, PRMD and a domain defined (DD) which indicates a RFC-822 user originated the message being sent. The recipient address remains identical to that described in block 110 above.

The message is then relayed from MTA 24 to MTA 24h via communications link 25 (block 114). The message is then further transferred via communication link 27 to message transfer agent 24d which will deliver the message to IPM user agent 54, for user H. The addresses utilized in blocks 114 and 115 are identical to those described above reference to block 113. At block 116 the delivery of the message from the SMTP mail user A to IPM X.400 user H occurs with the addresses and the body parts being included as discussed above. It can be seen from the previous two examples, how two paths exist between RFC-987 gateway 20 and sendmail 12. First, user A can send a X.400 message through mail handler 10 (IPM mode), sendmail 12, RFC-987 gateway 20 and onto MTA 24. Similarly, user A can send a RFC-822 message through mail handler 10 (in RFC-822 mode), sendmail 12, RFC-987 gateway 20 an onto message transfer agent 24.

Figure 8B:
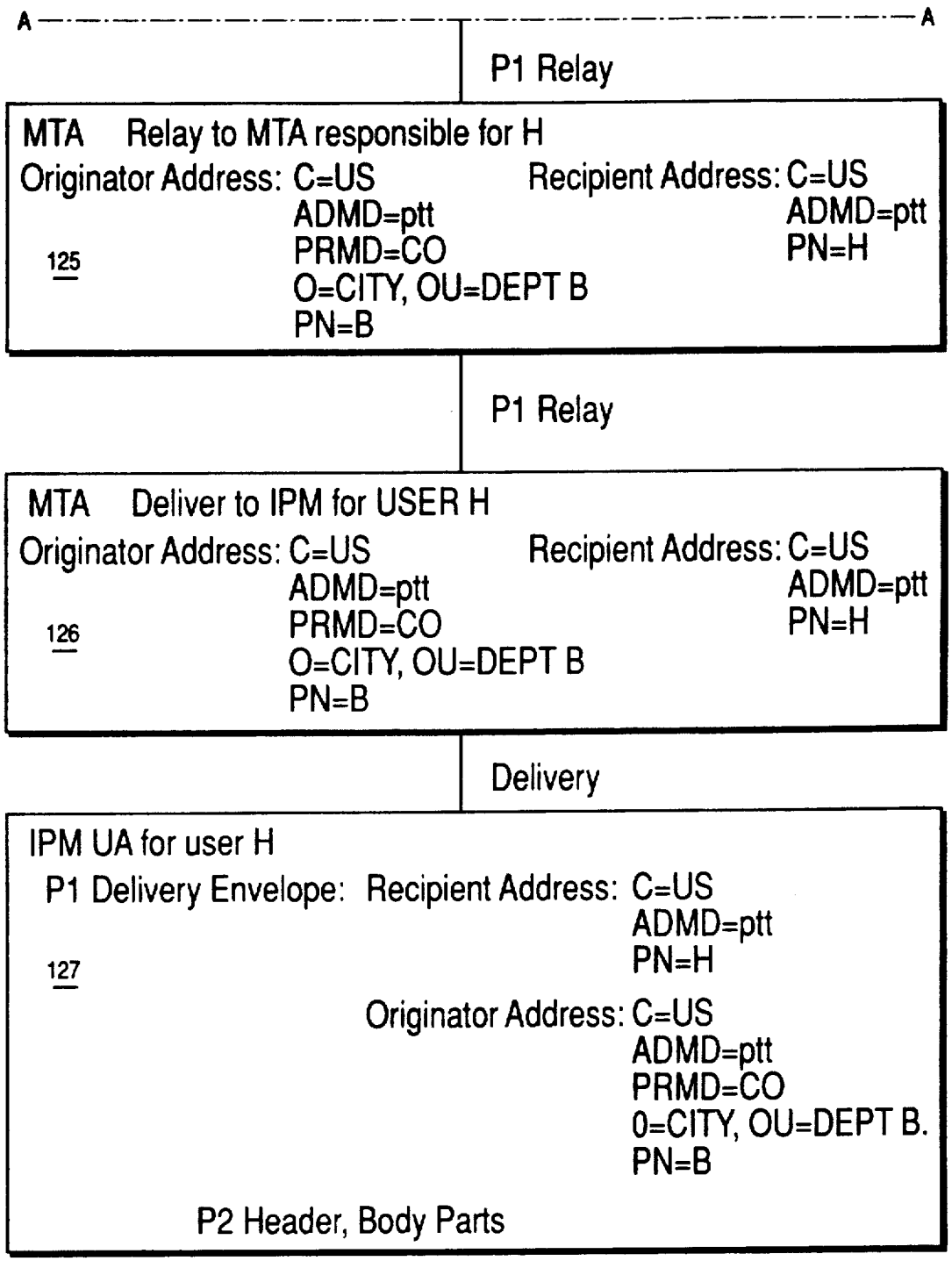

Referring to FIG. 8, mail handler 10 (in IPM mode) for user B generates a message to be delivered to user H at user agent 54. In block 120, the address for user H is shown and is identical to those previously shown in reference to FIGS. 6 and 7. The originating address for user B is shown in X.400 form with the country being the U.S., ADMD being ptt, the PRMD being co, for company, organization (O) as city, and organization unit (OU) as deptb (department B) with the personal name (PN) noted as B, for user B. This message is then transmitted to the sendmail 12B adjacent to mail handler 10. Block 121 of FIG. 8 illustrates the functionality which occurs in sendmail 12B. The X.400 mail message is encapsulated in RFC-822 headers such that it may be sent via the SMTP connection, included in TCP stack 22b, to the gateway sendmail 12. In this case, the address of gateway sendmail 12, in RFC-822 syntax, is appended to the address for user H noted in block 120. That is, /@depta.city.com is attached to the original To: address (in block 120) which routes this message to the user A host gateway 70. Similarly, the originating address now includes a RFC-822 header which shows that the message is from user B, ... B/@deptb.city.com. This RFC-822 address is then transferred via TCP stack 22b (FIG. 5) through communications link 58 and onto network 56 and on to sendmail 12 which recognizes the X.400 portion of the address and routes the message to RFC-987 gateway 20 for ASN.1 encoding, as previously noted. Block 123 indicates the conversion which occurs at RFC-987 gateway 20, wherein a conversion from ASCII text to the ASN.1 protocol data units is implemented and the message is then submitted to MTA 24, as noted by reference 124 on FIG. 8. MTA 24 accepts the converted protocol data units from RFC-987 gateway 20 and puts the originating address and recipient address back into the X.400 form. It can be seen that when transferring from SMTP to X.400 the addresses are stripped from the message as it travels through the layers of the gateway host 70. MTA 24 relays the X.400 to next MTA 24h via communications link 25, which in turn transmits the message to MTA 24d via communication link 27, as noted by blocks 125 and 127, respectively. At block 127, MTA 24d delivers the message to user H, the message including the recipient address, originator address, header and body parts.

Referring to FIG. 9, the example is shown where IPM X.400 user H desires to send a message to user C which is connected to a SMTP mail handling system. At block 130 the message is addressed by user H with the X.400 format being utilized, i.e. country is US, ADMD is ptt, PRMD is company (co) and the domain defined (DD) is for a user of a SMTP system, i.e. user C (C(a) deptc.city.COM). The originating address is in the X.400 format as discussed previously with reference to FIGS. 6–8. MTA 24d for user H accepts the submitted message from UA 54 and creates the protocol data units and encodes the message into ASN.1 form, which is the abstract syntax notation that places binary headers around the message in order to transmit it through the X.400 network. The originator and recipient addresses remain the same in block 131, as previously discussed with reference to block 130. The message is then transmitted via communication link 27 to MTA 24h which is now responsible for the incoming mail for user C, as noted at block 132. MTA 24 then accepts the transmitted message from the MTA 24h off of communication link 25 and delivers the X.400 message to the RFC-987 gateway 20 at block 134. Therefore, the X.400 message is considered by the present invention to be delivered to User C at the time it is transferred from MTA 24 to RFC-987 gateway 20. RFC-987 gateway 20 translates the X.400 message into RFC-822 format and decodes the ASN.1 information before passing the message to sendmail 12. RFC-987 gateway 20 changes the recipient address into RFC-822 format and appends a RFC-822 address onto the X.400 originating address such that the SMTP user C can recognize the sender as being user H. Block 135 sends the newly translated RFC-822 message from sendmail 12 to the sendmail 12c located locally with user C. At block 136 it is noted that sendmail 12c then places the message from X.400 user H in the mailbox for SMTP user C.

Figure 10B:
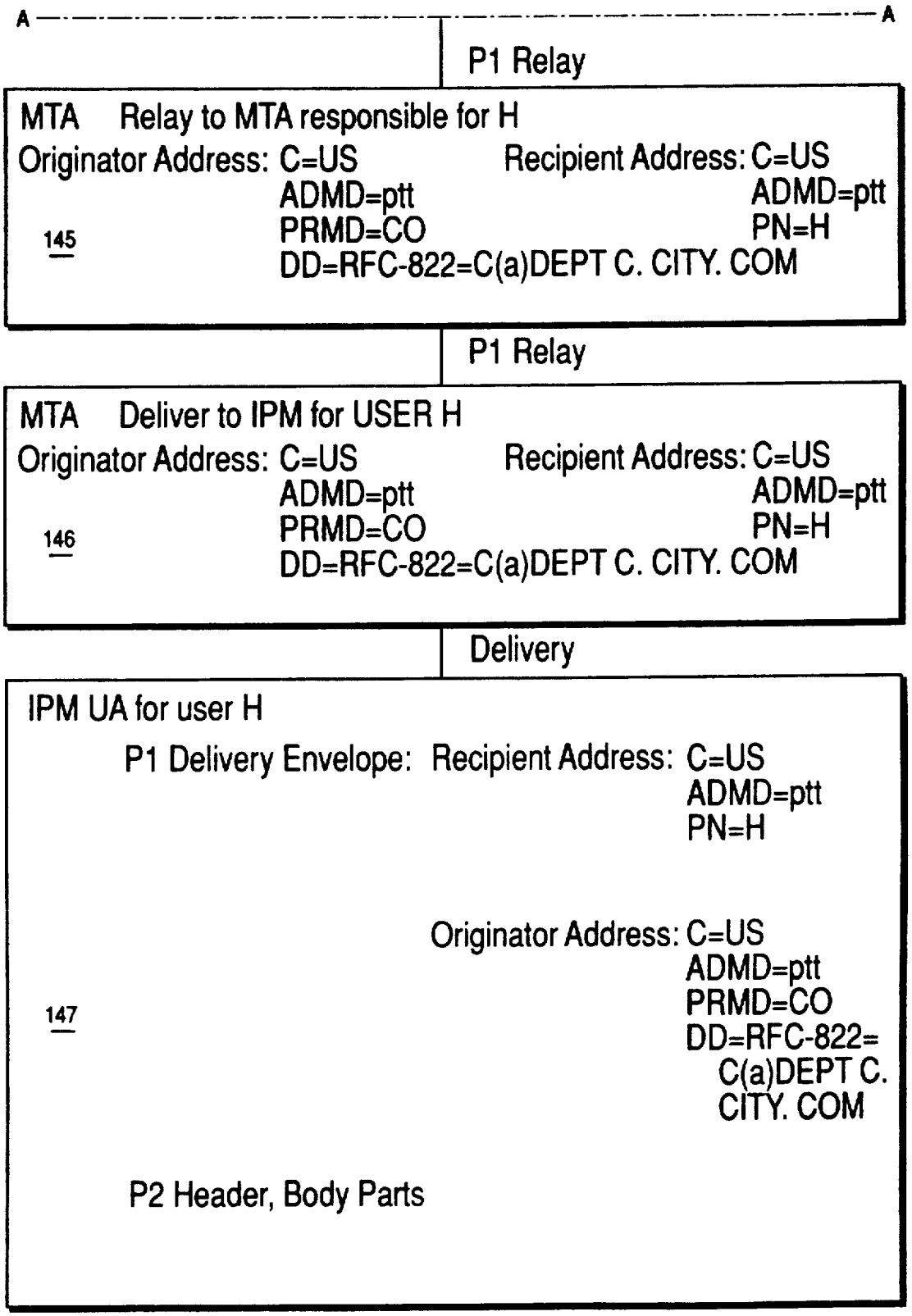

FIG. 10 illustrates the reverse situation where SMTP user C desires to send a message to X.400 user H. At block 140 it is noted that user C addressed the message in X.400 format and uses RFC-822 format for the originating address. The message is then sent to sendmail 12c (see block 141) which encapsulates the message in RFC-822 syntax with headers that will allow the message to be sent via the TCP/SMTP network to the gateway host 70. At block 142 the sendmail 12 recognizes the message as having an X.400 address and routes the message to the RFC-987 gateway 20 for encoding into the ASN.1 format. Next, the MTA 24 associated with gateway host 70 accepts the encoded message from RFC-987 gateway 20 and relays the message, with addresses now being in the X.400 format (block 144), to the MTA 24h via communication link 25 (block 145). MTA 24d receives the X.400 message from communication link 27 and delivers the message to user H, as noted by blocks 146 and 147. It should be noted that the originating and recipient addresses did not change after translation occurred at block 143.

Figure 11:
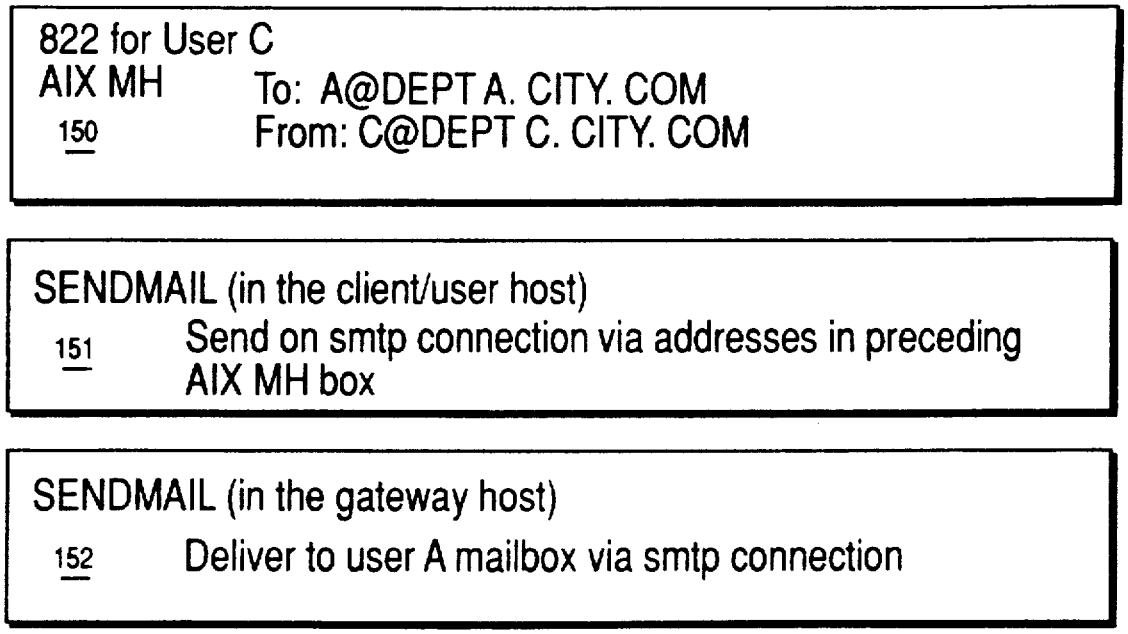
FIG. 11 illustrates how a TCP/IP user connected to a TCP system can sendmail to a SMTP user connected to the same TCP system.

Finally, the situation wherein two SMTP users wish to communicate with one another will now be described with reference to FIG. 11. User C addresses a message for recipient user A using RFC-822 format as noted by block 150. User C also uses the RFC-822 format for the originating address, since user C is aware of the recipient and knows the message will be travelling only in the TCP/SMTP network. At block 151, the message is delivered to the sendmail 12c for user C and then transmitted to sendmail 12 via the SMTP connection. Send mail 12 then places the message, without any need for translation, in the local mail queue 14 for user A (block 152).

It can be seen from the previous discussion that the present invention utilizes mixed mode addressing format, i.e. RFC-822 and X.400 addresses are used in conjunction with one another. This mixed mode addressing is accomplished in the same manner as is currently known in the art, with parsing done from right to left. However, one X.400 address cannot route a message to another X.400 address i.e. there cannot be consecutive X.400 addresses in the destination address. Message transfer agents are utilized by the present invention to accomplish source routing between X.400 locations. A slash is utilized in addressing messages in the system of the present invention as a separator, or delimiter for X.400 addresses. The only changes required to be made in order to achieve X.400 addressing capability in a mixed mode environment are to the re-write rules for the sendmail configuration file component and do not require changes to the code itself. Additional examples of mixed mode addresses will now be provided.

(1) a!b/C=US/ADMD=ptt/PN=username/c!d

This is a valid address since the / is used after the user name. When the parser detects the ! of c!d, it will interpret this as a UUCP address and realize that the X.400 address portion has been terminated.

(2) /C=US/ADMD=ptt/@uname1:b!/C=US-/ADMD=att/PN=uname2

Address (2) is a valid address containing two non-adjacent X.400 addresses, which is acceptable in the mixed mode addressing environment of the present invention.

(3) @username1:b!/C=US/ADMD=att/PN=username2

This is also a valid address and another address could be appended to the end by placing a separator (/) after username2.

It can be seen from the previous examples that gateway host 70 acts to prepend address information for messages transmitted from the TCP/SMTP network to the OSI network with the proper X.400 information, as the messages travels downwardly through the layers of gateway host 70. However, for messages entering the TCP/SMTP network from a X.400 user, via gateway 70, the prepended messages are stripped off as they travel upwardly through the layers of gateway host 70. In this manner the present invention allows for communication between users of different systems by altering the addresses associated with the messages.

Figure 12:
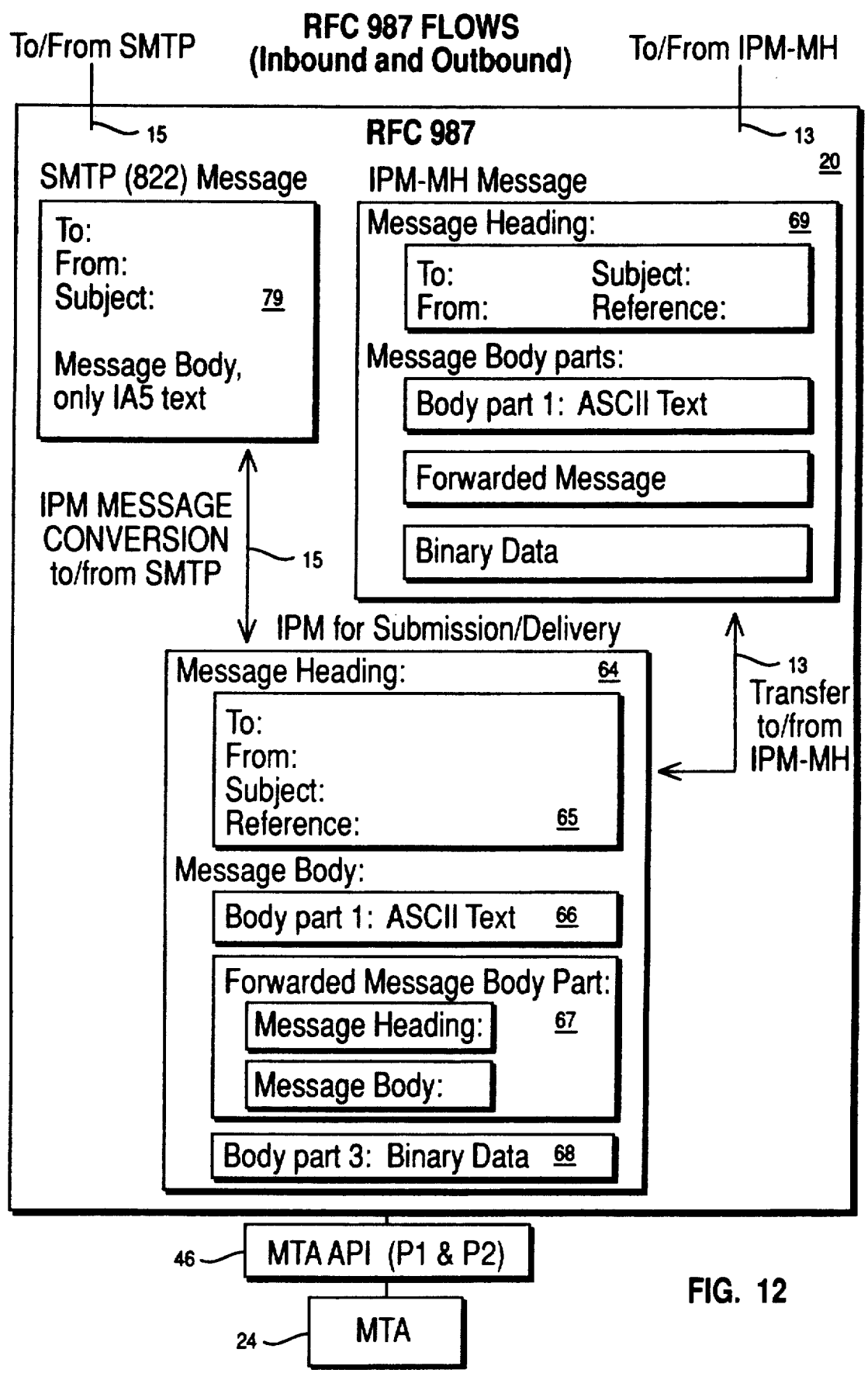
FIG. 12 is a block diagram showing the flow of X.400 and SMTP messages through RFC-987 gateway, required to implement the mail handling interface of the present invention.

Referring to FIG. 12, the improvements provided by the present invention to RFC-987 gateway 20 will be further illustrated. RFC-987 gateway 20 is shown with an IPM message input from MTA API 46 and MTA 24. This message contains a heading 65 and three body parts consisting of ASCII text 66, forwarded message 67 and binary data 68. Since the message 64 is in X.400 form, it can be transferred as is without any conversion through the IPM path 13 and ultimately to an IPM mail handler such as IPM MH 50 (FIG. 5). It can be seen that heading 65 and body parts 66,67,68 of message 64 exactly correlate to the IPM message as shown in FIG. 12 by reference numeral 69.

However, the message 64 may not be sent to the SMTP mail handling system because it contains non-ASCII body parts (reference numerals 67 and 68) It can be seen that an SMTP message 79 does not provide for three types of body parts, i.e, only IA5 (including ASCII) text will be accepted. Thus, the message 64 as shown in FIG. 12 has only one path 13 upon which it can be transferred. Although, message 64 can not be transferred to SMTP path 15, an IPM message containing only ASCII text will be processed into SMTP form (shown by SMTP message 79) and will be delivered to a SMTP mail handler, such as shown by reference numeral 10 of FIG. 5. Conversely, an outbound message from SMTP mail handler 10 to RFC-987 gateway 20 will be sent, but only with the ASCII text message.

Figure 13:
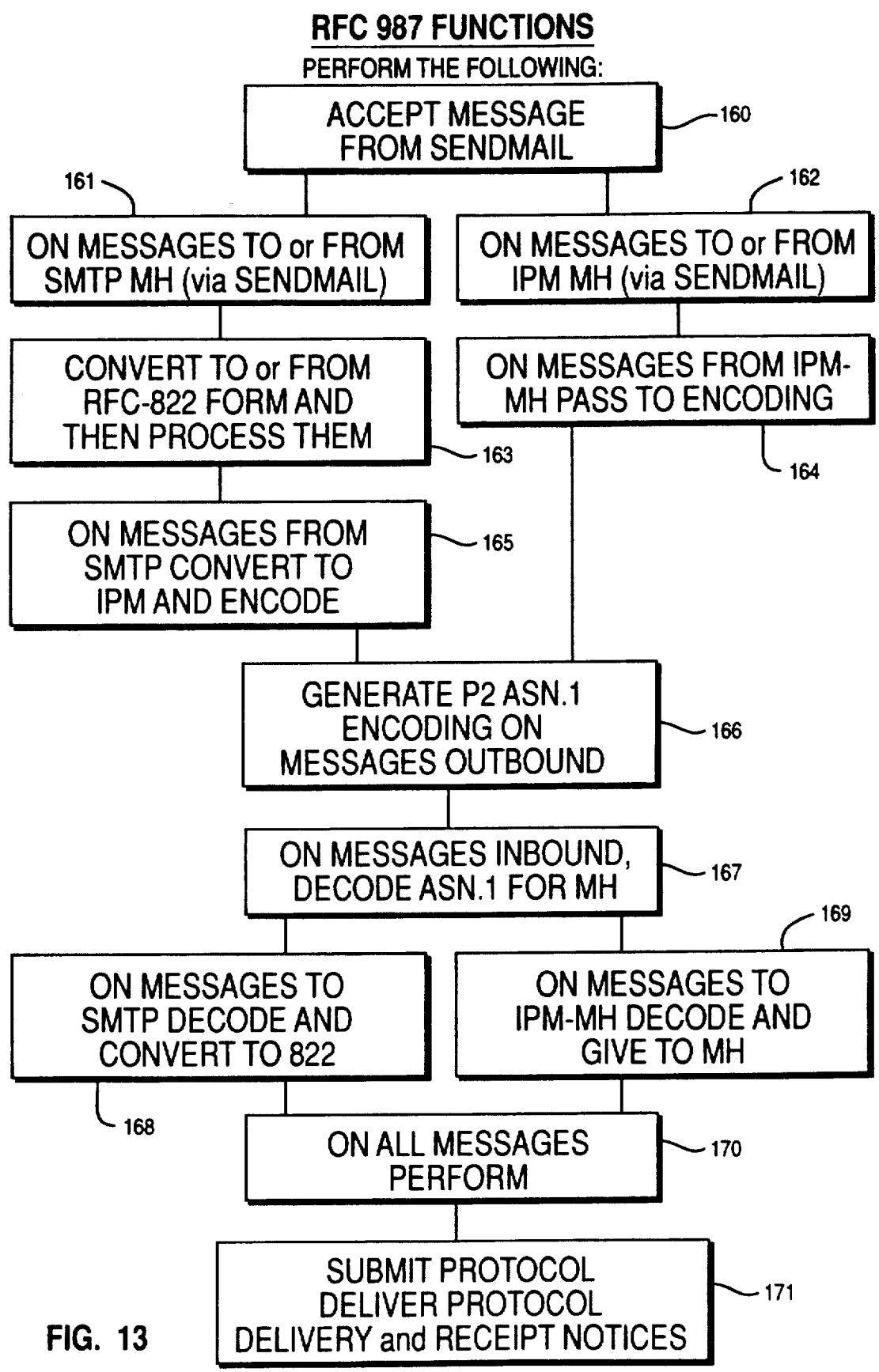
FIG. 13 is a process diagram of the steps used by the present invention to allow for the flow of messages through the RFC-987 gateway.

FIG. 13 is a process diagram illustrating the processes implemented by the present invention to provide the two paths between RFC-987 gateway 20 and the SMTP and X.400 mail handlers. At block 160, RFC-987 gateway 20 accepts the messages from sendmail 12. For messages to, or from a SMTP mail handler (block 161), the RFC-987 gateway 20 converts these messages to or from the RFC-822 format and processes them (block 163). Messages received from the SMTP mail handler are converted to X.400 format and encoded at block 165.

For messages to, or from an IPM mail handler (block 162) the messages are transferred directly to the encoding portion of the process (block 164), since no conversion between X.400 and SMTP format is required. Subsequent to the encoding at blocks 164 and 165, the RFC-987 gateway 20 generates, at block 166, an ASN.1 encoded message for outbound mail. For inbound messages, the the ASN.1 encoded message is decoded (block 167). Next, at block 168, for messages outbound from RFC-987 gateway 20 to a SMTP mail handler, the message text is decoded and converted into RFC-822 format. On messages outbound from RFC-987 gateway 20 to a X.400 mail handler, the message text is decoded and passed directly to the mail handler, since no conversion is required for IPM messages to the X.400 system. Finally, on all messages, whether SMTP or X.400 (block 170) the message submission protocol and message delivery protocol, along with all delivery and receipt notices are transferred between mail system users (block 171).

Figure 14:
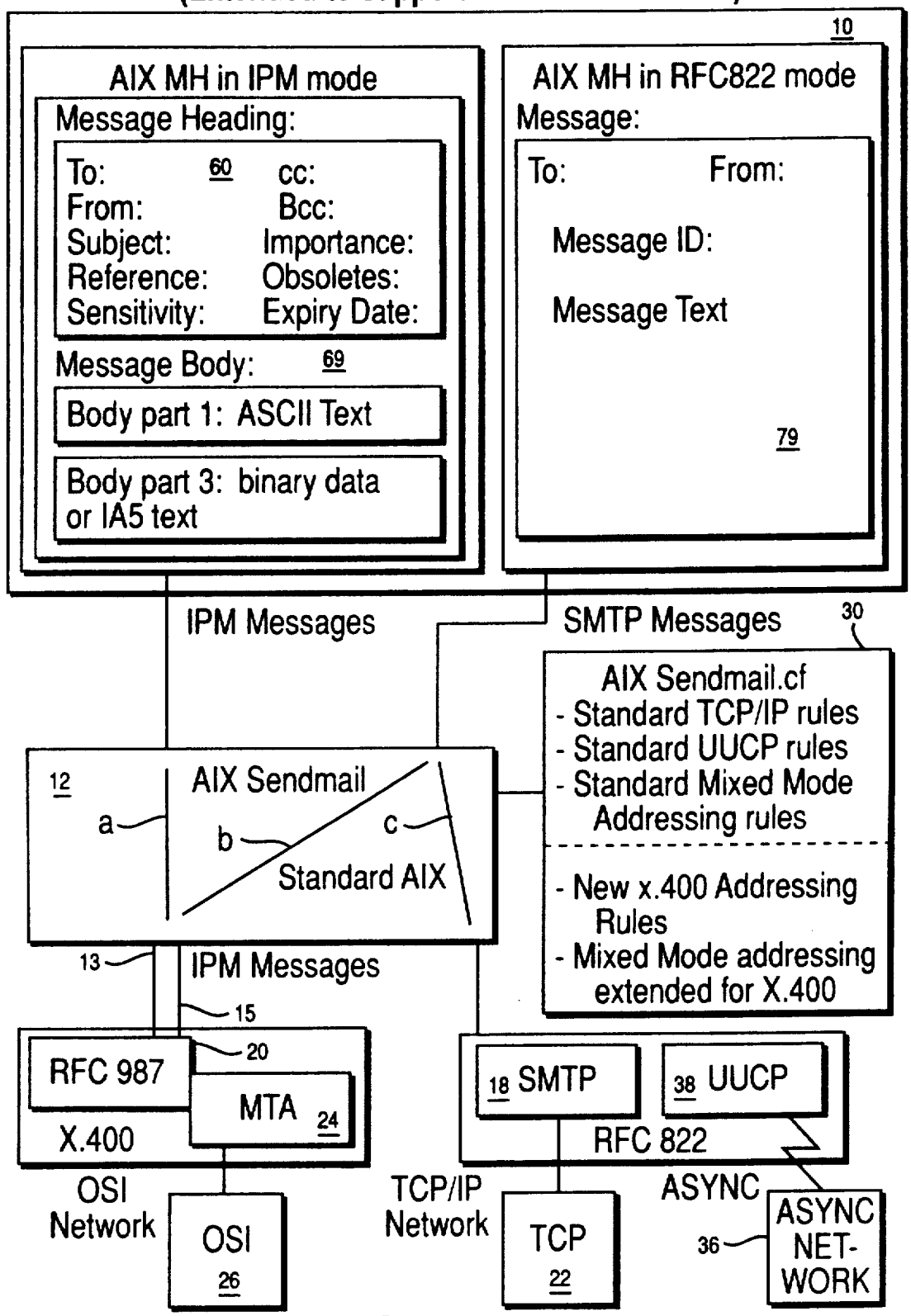
FIG. 14 is a block diagram showing the flow of messages through the sendmail component of the present invention and the changes required to implement this flow.

FIG. 14 is a block diagram illustrating the improvements by the present invention to the sendmail component of the mail handling system. The new functionality is shown by reference numeral 30, which is part of the sendmail configuration file. It can be seen that sendmail file 30 includes standard TCP/IP, UUCP and standard mixed mode addressing rules. The sendmail configuration file 30 also now includes the new X.400 addressing rules and extended mixed mode addressing rules such that X.400 addresses are usable in a mixed mode environment. The implementation of the new X.400 addressing rules have been previously described with reference to FIG. 4. That is, the message heading 60 now includes headers for: sensitivity; importance; obsoletes; expiry date; and reply to users. Similarly, the implementation of the extensions to mixed mode addressing have been illustrated by the examples previously discussed.

Referring to sendmail 12 of FIG. 14, two paths are included therein, which are a result of the new sendmail rules 30 of the present invention. Paths 13, 15 between sendmail 12 and RFC-987 gateway 20 are shown and in communication with paths "a", "b", respectively. As previously discussed path 13 (in conjunction with path "a", through sendmail 12) allow a X.400 message to be passed directly from RFC-987 gateway 20 to an IPM mail handler. Path "b" allows the conversion of an IPM message into RFC-822 format. Thus, path 15 and path "b", through sendmail 12, allow the IPM message (converted for receipt by a SMTP user) to be transferred to a SMTP mail handler. It can be seen that the new functionality provided by the new sendmail configuration file 30 is implemented in the creation of paths "a" and "b" through sendmail 12, whereas only path "c" is present in a conventional sendmail.

Figure 15:
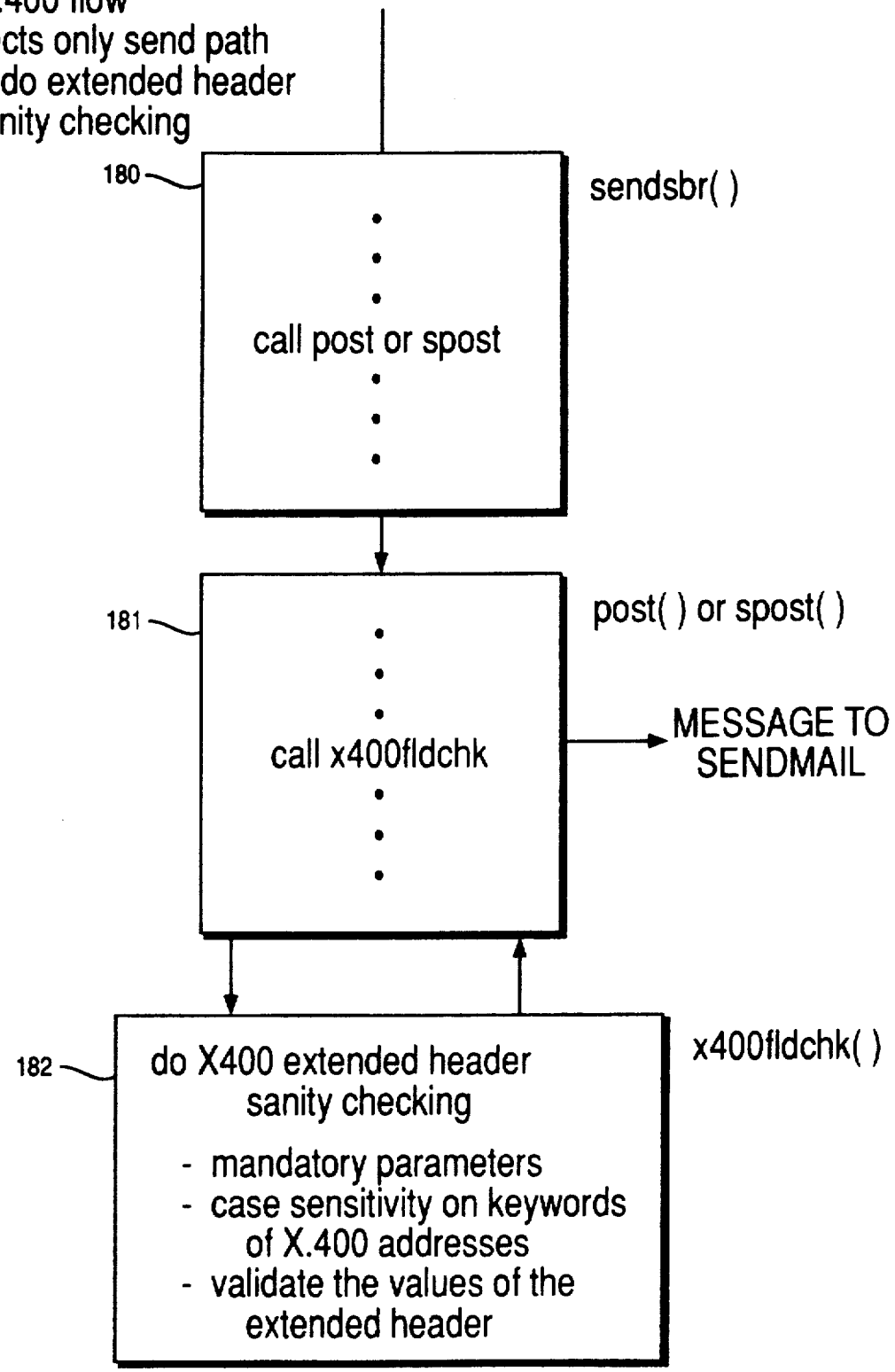
FIG. 15 is a process diagram representing the additional functionality required by the mail handler to operated in a manner consistent with the present invention.

The new features of the present invention incorporated into the mail handler component are represented generally by reference numeral 28 of the process diagram of FIG. 15. (also see FIG. 1). First, it should be noted that changes 28 affect only mail which is outbound from the mail handler i.e. mail handler 10 operates identically to a conventional mail handler, except for outbound X.400 mail. At block 180, mail handler 10 of the present invention implements a send subroutine, such as "sendsbr( )", which is a collection of routines used to help send messages, i.e. mail handling routines. The send subroutine then calls another subroutine "post( )", or "spost( )" (block 181). These subroutines are utilized to validate the headers and body of a messages being sent, i.e. does the message conform to the previously discussed format (FIGS. 3, 4 and 12). Subsequent to the "post( )", or "spost( )", subroutine a conventional mail handler would send the message to the sendmail component. However, in the mail handler of the present invention the "post( )", or "spost( )" subroutine calls another validation subroutine ("X400fldchk"). This X.400 field check subroutine validates the message being sent for the proper X.400 format (block 182). That is, extended headers, keywords and other parameters are validated for the proper X.400 format before the message can be sent to the sendmail component. FIG. 15 shows how the message is validated by the "post( )", or "spost( )" routines (block 181) and then passed to the X.400 field check routine (block 182) before being sent to the sendmail. In this manner, the present invention is able to validate outgoing messages for both the X.400 and SMTP format.

Although certain preferred embodiments have been shown and described, it should be understood that many changes and modifications may be made therein without departing from the scope of the appended claims.

What is claimed is:

1. A method for communicating between a data processing system and a first and second communication system, said first system having a first communication protocol and said second system having a second communication protocol, said method comprising the steps of:
   processing communications using said first protocol, by first means included in said data processing system;
   processing communications using said second protocol, by second means included in said first means;
   converting communications between said second protocol and said first protocol, transferring said converted communications between said second communication system and said first means, and transferring communications using said second protocol directly between said second communication system and said second means;
   transferring communications using said first protocol directly between said first communication system and said first means; and
   providing access, to a user of said processing system, to communications using said first and second protocols, from said first and second systems, respectively.

2. A method according to claim 1 wherein said step of processing communications using said second protocol comprises the steps of:
   providing header fields used by said second communication protocol; and
   indicating to said user when said converted communications, received by said first means, contain information using said first protocol.

3. A method according to claim 2 wherein said step of converting comprises the steps of:
   adding address information, of said first protocol to communications received, from said second system using said second protocol such that a mixed address is provided; and
   deleting address information of said first protocol from communications using said mixed address, output by said first means to said second system.

4. A method according to claim 3 wherein said step of converting, further comprises the steps of:
   providing a first communication path between said second system and said second means; and
   providing a second communication path between said second system and said first means, wherein said second path transfers said converted communications.

5. A method according to claim 4 wherein said step of providing access further comprises the step of providing a message storing queue.

6. A method according to claim 5 wherein said message storing queue includes communications using said first protocol and said second protocol.

7. A data processing system for communicating between a first and second communication system, said first system having a first communication protocol and said second system having a second communication protocol, comprising:
   first means for processing communications using said first protocol;
   second means, included in said first means, for processing communications using said second protocol;
   means for converting communications between said second protocol and said first protocol, and for transferring said converted communications between said second communication system and said first means, and for transferring communications using said second protocol directly between said second communication system and said second means;
   means for transferring communications using said first protocol directly between said first communication system and said first means; and
   means for providing access, to a user of said processing system, to communications using said first and second protocols, from said first and second systems, respectively.

8. A system according to claim 7 wherein said second means comprises:
   means for providing header fields used by said second communication protocol; and
   means for indicating to said user when said converted communications, received by said first means, contain information using said first protocol.

9. A system according to claim 8 wherein said means for converting comprises:
   means for adding address information, of said first protocol to communications received, from said second system, using said second protocol, such that a mixed address is provided; and
   means for deleting address information of said first protocol from communications using said mixed address, output by said first means to said second system.

10. A system according to claim 9 wherein said means for converting, further comprises:
   a first communication path between said second system and said second means; and
   a second communication path between said second system and said first means, wherein said second path transfers said converted communications.

11. A system according to claim 10 wherein said means for providing access further comprises a message storing queue.

12. A system according to claim 11 wherein said message storing queue includes communications using said first protocol and said second protocol.

* * * * *